United States Patent [19]

Jensen et al.

[11] Patent Number: 4,962,286

[45] Date of Patent: Oct. 9, 1990

[54] ENVIRONMENTAL CONTROL, LINER FOR SPLICE ENCLOSURE

[75] Inventors: Michael L. Jensen, Cary; Craig D. Ray, Raleigh; Thomas Hunter, Cary; Keith Dawes, Raleigh, all of N.C.

[73] Assignee: Raychem Corporation, Menlo Park, Calif.

[21] Appl. No.: 254,335

[22] Filed: Oct. 6, 1988

[51] Int. Cl.$^5$ .......................................... H02G 15/113
[52] U.S. Cl. ........................... 174/92; 174/84 R; 156/49
[58] Field of Search ................ 174/92, 84 R; 156/49

[56] References Cited

U.S. PATENT DOCUMENTS

| | | | |
|---|---|---|---|
| 3,243,211 | 3/1966 | Wetmore | 287/78 |
| 3,297,819 | 1/1967 | Wetmore | 174/127 |
| 3,396,460 | 8/1968 | Wetmore | 29/859 |
| 3,446,384 | 9/1969 | Martin | 174/92 |
| 4,206,786 | 6/1980 | Wetmore | 138/178 |
| 4,262,168 | 4/1981 | Bossard | 174/77 R |
| 4,472,222 | 9/1984 | Moisson et al. | 174/92 X |
| 4,486,620 | 12/1984 | Ball et al. | 174/92 X |
| 4,511,611 | 4/1985 | Moisson | 174/92 X |
| 4,600,261 | 7/1986 | Debbaut | 439/521 |
| 4,610,738 | 9/1986 | Jervis | 156/49 |
| 4,634,207 | 1/1987 | Debbaut | 439/521 |
| 4,643,924 | 2/1987 | Uken et al. | 428/35.7 |
| 4,647,717 | 3/1987 | Uken | 174/84 C |
| 4,690,831 | 9/1987 | Uken et al. | 427/44 |
| 4,701,574 | 10/1987 | Shimirak et al. | 174/77 R X |
| 4,718,678 | 1/1988 | Vansant | 277/1 |

FOREIGN PATENT DOCUMENTS 2105529 3/1983 United Kingdom ............ 174/84 R

Primary Examiner—Morris H. Nimmo
Attorney, Agent, or Firm—A. Stephen Zavell; Herbert G. Burkard

[57] ABSTRACT

A toolless environmental splice enclosure capable of fitting within an aerial splice case is disclosed. The environmental closure permits sealing and reentry to a cable splice region.

14 Claims, 2 Drawing Sheets

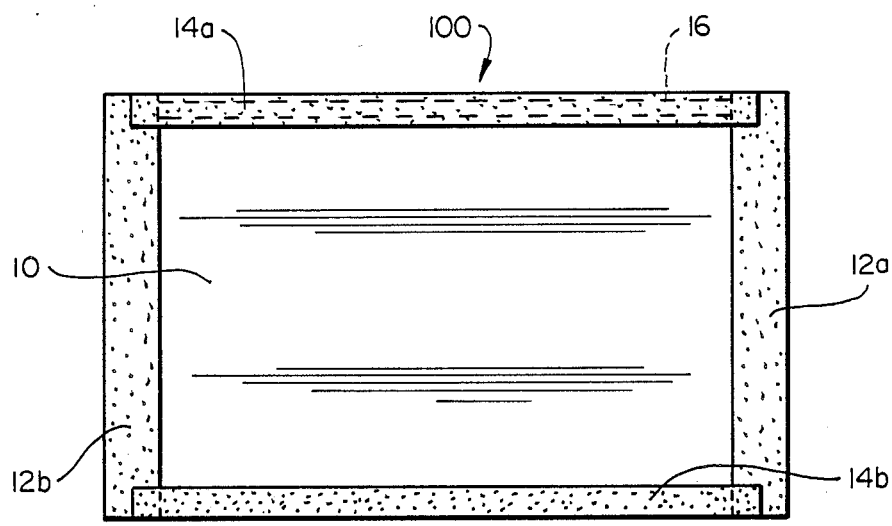
FIG_1
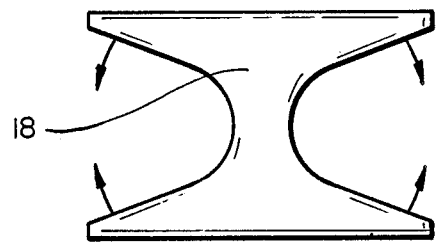
FIG_2
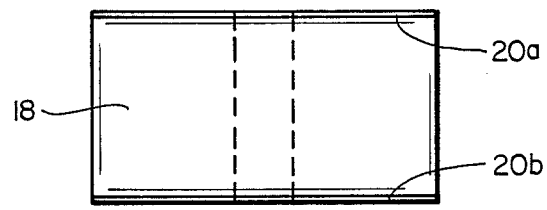
FIG_3

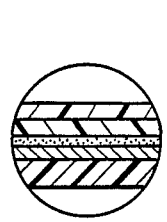
FIG_4b
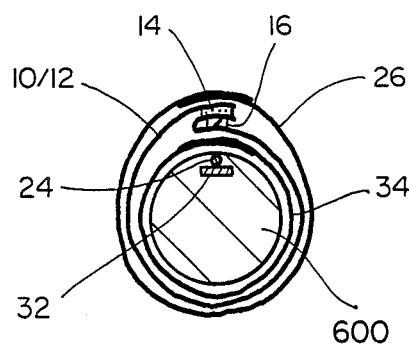
FIG_4a
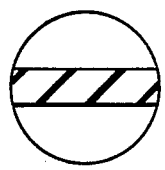
FIG_4c
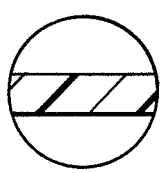
FIG_5b
FIG_5a
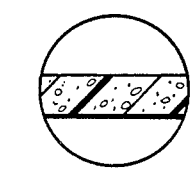
FIG_5c
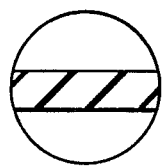
FIG_6b
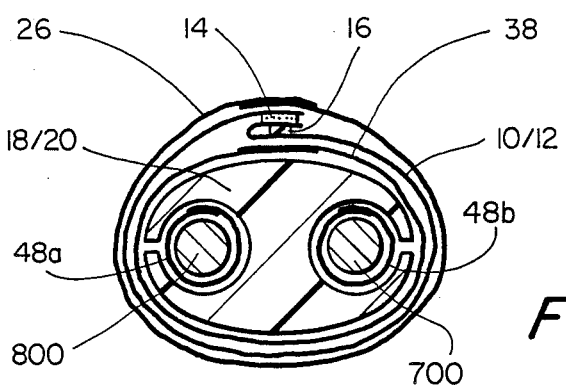
FIG_6a
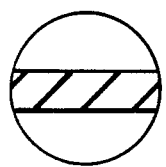
FIG_6c

ENVIRONMENTAL CONTROL, LINER FOR SPLICE ENCLOSURE

FIELD OF THE INVENTION

This invention relates to an environmental control liner for a splice enclosure. More particularly, this invention relates to an liner for an aerial cable closure. In particular, this invention relates to a sealed liner for aerial closure for spliced cables which retards oxygen permeation, ultraviolet degradation and/or exposure to water either liquid or vapor on the fine internal wires in the cable.

BACKGROUND OF THE INVENTION

Cables carrying multiple conductors especially telecommunications cables which carry a plurality of fine insulated wires within the body of the cable are subject to premature failure when the cable must be cut open to splice the cable either for drop wires or in replacing a section of damaged cable. Once the outer protective jacket of the cable including metal jacket is severed for a splice, the finer inner wires require protection from the ingress of water, and the deliterious action of oxygen, as well as ultraviolet radiation degradation.

Aerial metal canister enclosures seal the cable but require the use of tools such as wrenches and pliers. The manipulation of the tools while in the air is cumbersome and dangerous. Toolless mastic sealing systems are adequate unless the cable splice must be re-entered. The removal of the mastic from the splice area is a time consuming and dirty job. Heat-shrinkable enclosures work well but it is often inappropriate or unsafe to use a torched closure system. Thus it would be desirable to have a toolless environmental seal that avoided the use of mastics or similar adhesives in the splice area.

Splice enclosures such as Trac TM Splice Enclosure from Raychem or similar closures provide protection to the fine inner wires from ultraviolet radiation. These closures are preferred by telephone craftspeople because the aerial installation is done without tools. However, a more complete nonsplice area mastic system would be desirable. The environmental seal must minimize the exposure of the inner insulated wires to water or water vapor and oxygen because oxygen attacks the inner plastic insulation which accelerates embrittlement and water exposure causes shorting and crosstalk once the insulation cracks.

Thus, it would be highly desirable to have an environmental closure capable of fitting within a standard aerial enclosure that will enhance the protection of the spliced portion of the cable. However, if the spliced portion of the cable needs to be reentered to introduce additional splices or drop wires, it would be desirable to have a system that provides inconvenient but easy access to the splice, i.e., all other parts of the system are more easily checked but the splice area can be reentered if the problem is isolated to the splice area.

It is thus an object of this invention to provide an environmental control liner capable of fitting within an existing aerial enclosure and sealing the splice region while providing inconvenient but easy access to the splice area once the craftsperson decides reentry to the splice is necessary. It is also an object of this invention to provide enhanced moisture, vapor and oxygen protection for the fine wires within the cable. A still further object of the invention is to avoid the need to remove any installed sealing mastic adhesive to enter the splice.

Additional objects of the invention will be apparent from the following description.

SUMMARY OF THE INVENTION

This invention provides a compact environmental seal for the spliced area of a cable, and particularly a telecommunication cable having the plurality of fine internal wires, which accomplishes the previously recited objects and retains the desired features recited previously while also providing additional benefits readily apparent to the skilled artisan from the following more detailed description.

More specifically, the invention provides for an oxygen and water resistant enclosure having nonreadily removable seals to the cable on opposite sides of the splice region with a removable environmental enclosure sealed thereto. More specifically, the environmental closure is formed by materials which, although providing a barrier to the ingress of water and oxygen, can be easily be disassembled to provide access to the splice area.

BRIEF DESCRIPTION OF THE DRAWINGS

FIG. 1 illustrates a top view of the environmental sealing film.

FIG. 2 illustrates a cross-sectional view of a sealing core for a two-cable branchout configuration.

FIG. 3 illustrates a top plan view of the sealing core illustrated in FIG. 2.

FIG. 4a illustrates a cross-sectional view of the sealing core mental closure on a single main cable.

FIG. 4b illustrates an exploded view of element 10/12.

FIG. 4c illustrates an exploded view of element 28.

FIG. 5A illustrates a cross-sectional view of the environmental closure through the spliced portion of the cable splice.

FIG. 5b illustrates an exploded view of element 26.

FIG. 5c illustrates an exploded view of element 34.

FIG. 6A illustrates a cross-sectional view of the environmental closure at a two-cable branchout portion of the cable.

FIG. 6b illustrates an exploded view of element 38.

FIG. 6c illustrates an exploded view of element 48b.

DETAILED DESCRIPTION OF THE INVENTION

The invention will be more particularly described with reference to the Figures. FIG. 1 illustrates a top plan view of the oxygen-moisture barrier environmental sealing film 100 including reenterable sealing means 12 and 14. More specifically, the environmental sealing film 100 comprises an oxygen/moisture impervious material 10 with strips of sealing material 12a and 12b and longitudinal sealing strips 14a and 14b. A support bar 16 on the surface opposite to the surface on which the sealing material 14a /b adheres provides support for the formation of the longitudinal seam.

A suitable environmental liner film 10 comprises a layer of a tear resistant material such as cross-plies of oriented HDPE high density polyethylene (HDPE). A suitable material is marketed under the tradename Valeron and a suitable thickness is about 3 thousands of an inch. However, any tear-resistant material is suitable for this purpose such as linear low density polyethylene, nylon, polypropylene, polyester sheets, i.e., (Mylar TM), and like. Bonded to the tear resistant material with a suitable adhesive about 1 thousands of an inch thick such as Surlyn TM adhesive is a thin-flexible moisture and oxygen barrier of aluminum foil about 0.00035 inches thick or other suitable oxygen-water barrier material. Finally, the liner 10 is completed with a second film of either HDPE or Surlyn TM film about 3 thousand of an inch thick adhering to the aluminum foil through about one thousands of an inch thick layer of a suitable adhesive such as a Surlyn TM adhesive. Although this particularly preferred construction has been specified, any moisture-oxygen barrier material having abrasion and tear resistance is suitable for use within the invention.

Adhered to a surface of the film 10 are wide edged strips 12a and 12b of a sealing material capable of removably sealing to the cable or the non-easily removable surface built-up or around the cable surface. Although the gel strips can be adhered to either surface, preferably, the gel strips adhere to the cross-ply of HDPE surface, i.e., HDPE sheet is adjacent the cable splice. The sealing material is preferably a gel or a gel-based material having a cone penetration of from about 50 to 350 (10−1 mm) and an ultimate elongation of at least about 100% and preferable greater than about 200%. A suitable soft compliant sealing material is about a 2-inch wide and 0.040-inch thick GelTek ®tape and more specifically GelTek ®1000 Strip Tape, a product of the Raychem Corporation. The tape is adhered to the film 10 through the use of an adhesive such as a silicone adhesive or similar material such as RTV TM silicone. On the same side of film as strips 12a and 12b and along the longitudinal seam of the film 10 are additional strips of sealing material 14a and 14b. Preferably, strips 14a and 14b are a gel material. A suitable soft compliant sealing material is about a 1-inch wide and about 0.040-inch thick strip of GelTek ® 1000 sealing tape. Other suitable sealing under-pressure gels are described in U.S. Pat. Nos. 4,634,207; 4,643,924; 4,647,717; 4,600,261; 4,610,738; 4,634,207; 4,643,924; 4,647,717; 4,690,831; 4,701,574; and 4,718,678, all of said patents completely incorporated herein by reference for all purposes.

On the major surface opposite to the surface on which the sealing strips 12a, 12b, 14a, and 14b adhere is a support strip 16. Preferably the strip 16 adheres to the Surlyn TM film/aluminum side. The support strip provides a firm backing for pressuring the sealing strips 14a and 14b together to form the longitudinal seal therebetween. A suitable strip is selected from the group consisting of a polypropylene strip, a polyethylene strip, a metal strip, mixtures thereof, or the like. More generally, the backing strip need only provide sufficient support to enable an adequate longitudinal seal to be made between strips 14a and 14b when the strips are brought together around the splice region between the cables.

Although the sealing strips 12a, 12b, 14a, and 14b can seal directly to a large diameter cable, the splice area is generally of greater diameter then the cables. Thus, the cable diameters are preferably built-up to a diameter which more closely approximates the diameter of the splice area. The build-up is accomplished with a sealing means such as a rubber mastic tape. A suitable rubber mastic tape is 3M's 2228 mastic rubber tape. The sealing means preferably has a sticky surface to adhere to the cable and itself. However, the tape backing surface should permit the easy removal of the environmental sealing film 10.

In a two branchout configuration, the smaller cable diameters are preferably build up through the application of a sealing means such as 3M's 2228 mastic rubber tape. Around the built-up cables is a sealing core means such as a mastic core 18. The sealing means is illustrated in FIGS. 2 and 3. The mastic core 18 is folded around the cables as illustrated by the arrows. The material is preferably maliable down to about 0° C. To restrain the flow of the sealing material at temperatures of up to about 60° C., the surfaces facing towards and away from the splice region are coated with a flowrestraining means such as a natural or synthetic foam 10a and 20b. The flow restraining means 20a and 20b inhibit to flow of the material 18 into the splice are where its removal upon reentry is messy and time consuming.

More specifically, mastic is an adherent, cohesive sealing material intended to fill a gap between two components. A mastic can deform or yield plastically, that is, undergo viscous flow, both during application and in subsequent service at ambient temperatures. Mastics may consist of mixtures of substantially non-crystalline materials, for example, bituminous materials elastomers, or thermoplastic polymers, and may contain inert fibrous or powdered fillers. Examples of mastic materials are disclosed in U.S. Pat. No. 3,243,211; 3,297,819; 3,396,460; and 4,206,786, each patent is completely incorporated herein by reference for all purposes. Of course the mastic is optimized for the specific environment. A suitable method for determining the viscosity of mastics is set forth in ASTM D-3579 (Procedure A or B).

After the sealing core branchout means 18 is applied to the cables, the core 18 is coated with a foam or thin rubber tape or optionally wrapped with a diameter enhancing sealing means such as 3M's 2228 mastic rubber tape. This further increases the diameter and provides a surface to which the sealing gel 12 can adhere but from which it can be easily removed. Thus, a permanent seal is provided to the cable on either side of the splice region by the sealing means of a mastic and/or mastic tape while a surface is provided to which the sealing material 12, i.e., the gel, can removably adhere. The combination provides an oxygen and moisture barrier environmental closure wherein the environmental film is easily applied and removed without tools or messy mastic removal. Upon reentry, a new liner is used but the mastic seals are generally not touched unless their diameter must be increased with more mastic rubber tape.

Having described the environmental oxygen/moisture barrier sealing film and the cable sealing means, the installed invention will be more clearly illustrated by referring to the cross-sectional FIGS. 4, 5, and 6 wherein the invention is described having a single main cable with a smaller two-cable branchout. However, the environmental closure is suitable for any number of cables. In providing a seal around a spliced cable 600, the ends of the cables 500, 700, and 800 are held together by a conductive grounding bar 32 and wire 24. The grounding wire 24 is conductively attached to the cable 500 and also environmentally sealed thereto with a sealing material such as mastic film piece 22. The cables 500, 700, and 800 are surrounded by an inner sealing means such as a layer of mastic rubber sealing tape 28, 48a and 48b, (FIG. 4c and FIG. 6c, respectively), respectively. Surrounding the two branchout cables 700 and 800 is the sealing core, 18/20. This is further sealed a rubber mastic tape 38. (FIG. 6b). As illustrated, the environmental sealing film 10, (2b, 6b) is sealed along the longitudinal seam 14 as assisted by the strip 16 and folded around the splice 600. The actual splice region is surrounded by a puncture resistance means such as a foam liner 34, (FIG. 5c). The sealing means 12, (FIG. 4b), seals to the more permanent sealing means 28 and 38 and the closure is tuck folded around the splice and wrapped with a pressure maintaining means 26(FIG. 5b), such as the product called Perma-Wrap, i.e., a polyvinyl chloride or polyethylene tape, or like tape having an elongation ability in excess of 50% and preferably 100% without breaking. The pressure maintaining means hold the gel under compression to ensure a tight seal against an ingress of oxygen and moisture. Finally, the ends of the pressure retaining means 26 is wrapped with a suitable tape such as black electrical tape. In operation, the environmental enclosure is capable of withstanding a two PSI flash pressure for 15 minutes in room temperature water as well as a water immersion test to test for negative pressure for 30 days in three feet of water. Clearly such severe environments are not encountered in aerial enclosures. Once installed, the compact environmental closure can be inserted into an aerial closure such as a Trac TM Aerial Closure, a product of the Raychem Corporation, or any other suitable enclosure.

The invention has been described with referenced to particularly preferred embodiments. Modifications which would be obvious to one of ordinary skill in the art are contemplated to be within the scope of the invention. For example, the central sealing core could be formed of a hard material such as plastic surrounded by a mastic or a gel encased in a hard pressure maintaining core to which the outer removable sealing means 12 can adhere and seal under pressure.

We claim:

1. An environmental closure capable of sealing around a spliced portion of a cable or between a first and a second cable or multiple cables to inhibit the degradation of the exposed internal cable wires from moisture and oxygen comprising:
    conductive means for conductively joining opposing first and second cable ends together around a cable splice therebetween;
    sealing means for sealing to the opposing first and second cable ends with the cable splice and means for conductively joining the opposing first and second cable ends therebetween;
    removable sealing means for sealing to the means for sealing the opposing first and second cable ends;
    an environmental liner film longitudinally adhered to itself through a removable sealing means and also adhered to the removable sealing means on the opposing ends of the first and second cables under pressure; and
    pressure maintaining means to maintain the environmental liner film adhered to itself and the opposing first and second cable ends.

2. The environmental closure according to claim 1 wherein the means for sealing to the opposing first and second cable ends are first and second, respectively, sealing tapes having a major adhesive surface containing each cable surface and a non-adhesive major surface opposite thereto.

3. The environmental closure according to claim 2 wherein the removable sealing means is a gel maintained under compression by the pressure maintaining means to the non-adhesive major surface of the sealing tape.

4. The environmental closure according to claim 3 wherein the environmental liner film is a plastic metal laminate.

5. The environmental closure according to claim 4 wherein the pressure maintaining means is a non-adhesive polyvinyl chloride tape.

6. The environmental closure according to claim 5 wherein the second cable end is at least a two cable branchout and the at least two-cable branchout is sealed together by a mastic sealing means.

7. An environmentally sealed cable splice comprising:
    mastic sealing means contacting each of the ends of at least two opposing cables held together by a conductive bond bar;
    non-adhesive sealing means adhered to the mastic sealing means;
    an oxygen and moisture impervious film adhered to the non-adhesive sealing means by a gel under pressure sealing means; and
    means for maintaining the gel under pressure.

8. The environmentally sealed cable splice according to claim 7 wherein the splice comprises a plurality of sealed cables.

9. A reenterable method of environmentally sealing a cable comprising:
    providing substantially permanent sealing means on opposing cable ends of a cable splice with the cable splice therebetween;
    contacting the substantially permanent sealing means with a non-adhesive but substantially oxygen and water impervious material;
    removably sealing an oxygen and water impervious barrier material to the non-adhesive material with a gel under pressure; and
    pressuring the oxygen and water barrier having the gel therebetween to the cable ends.

10. The method according to claim 9 wherein the substantially permanent sealing means is a mastic and the oxygen and water impervious material is a metal plastic laminate film.

11. The method according to claim 10 wherein the removably sealing gel is a gel selected from the group consisting of a silicone gel, a kraton gel, a urethane gel, and mixtures thereof.

12. An environmental splice enclosure kit-of-parts capable of providing an environmental closure for a spliced cable comprising:
    an oxygen and water impervious film, said film containing a gel sealing means adhered thereto;
    mastic-rubber tape for sealing to said cables; and
    a rigid conductive bar for holding the opposing cable ends together.

13. The kit according to claim 12 further comprising a mastic sealing core capable of sealing a plurality of cables.

14. The kit according to claim 13 further comprising a non-adhesive pressure maintaining tape.

* * * * *